A. F. PAUL & A. J. TANNER.
PASSENGER VEHICLE.
APPLICATION FILED FEB. 1, 1913.
1,265,367.
Patented May 7, 1918.
5 SHEETS—SHEET 1.
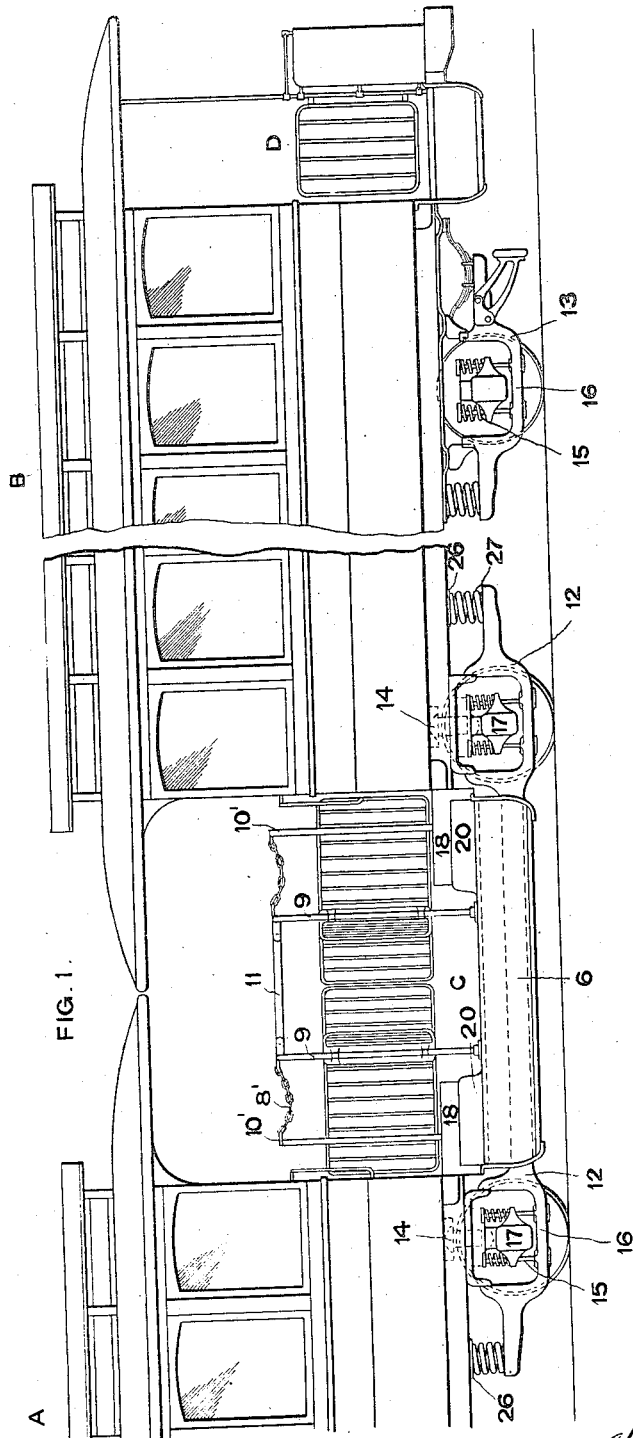
Witnesses
Leonard S. ...
Roy King
Inventor
Abram Frank Paul
Arnold J. Tanner

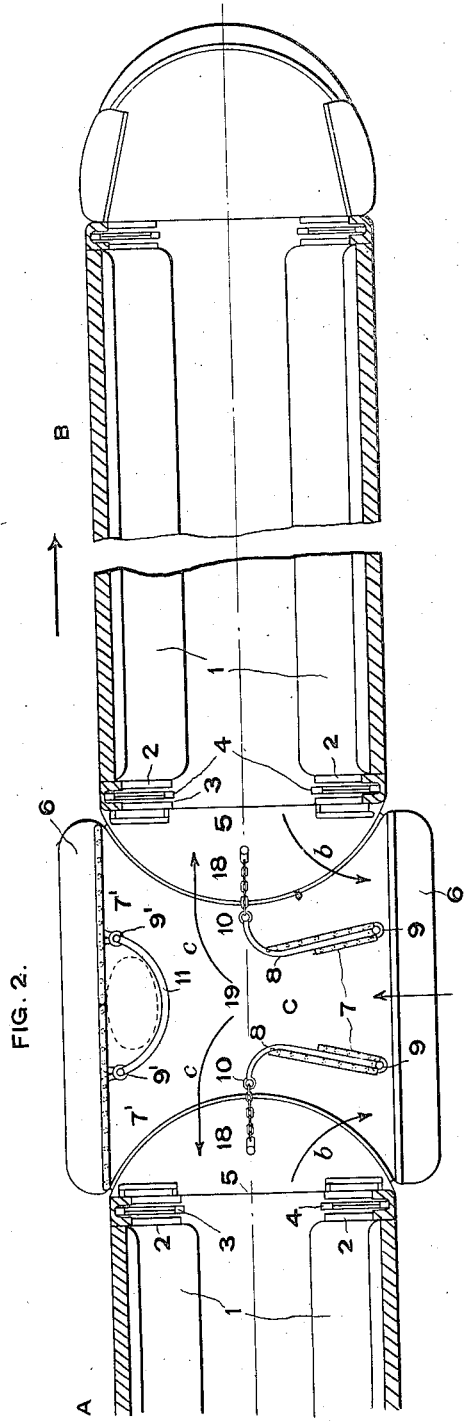

A. F. PAUL & A. J. TANNER.
PASSENGER VEHICLE.
APPLICATION FILED FEB. 1, 1913.
1,265,367.
Patented May 7, 1918.
5 SHEETS—SHEET 3.
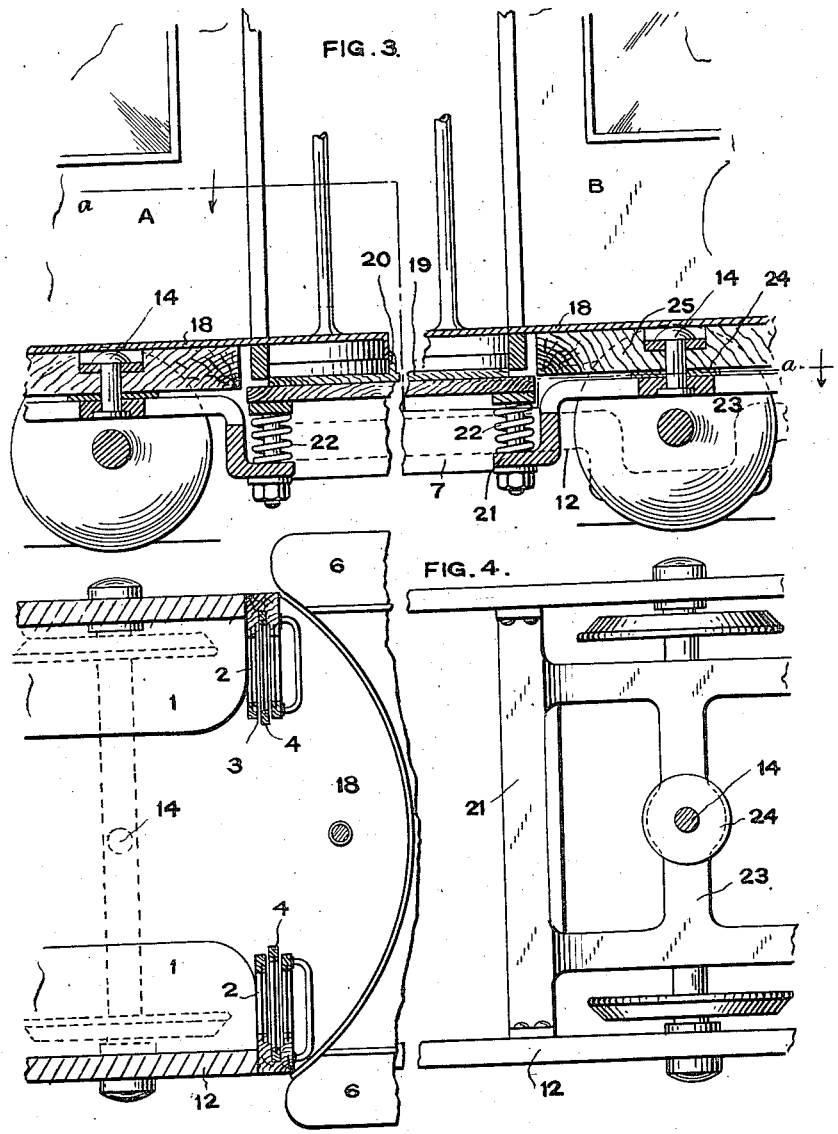

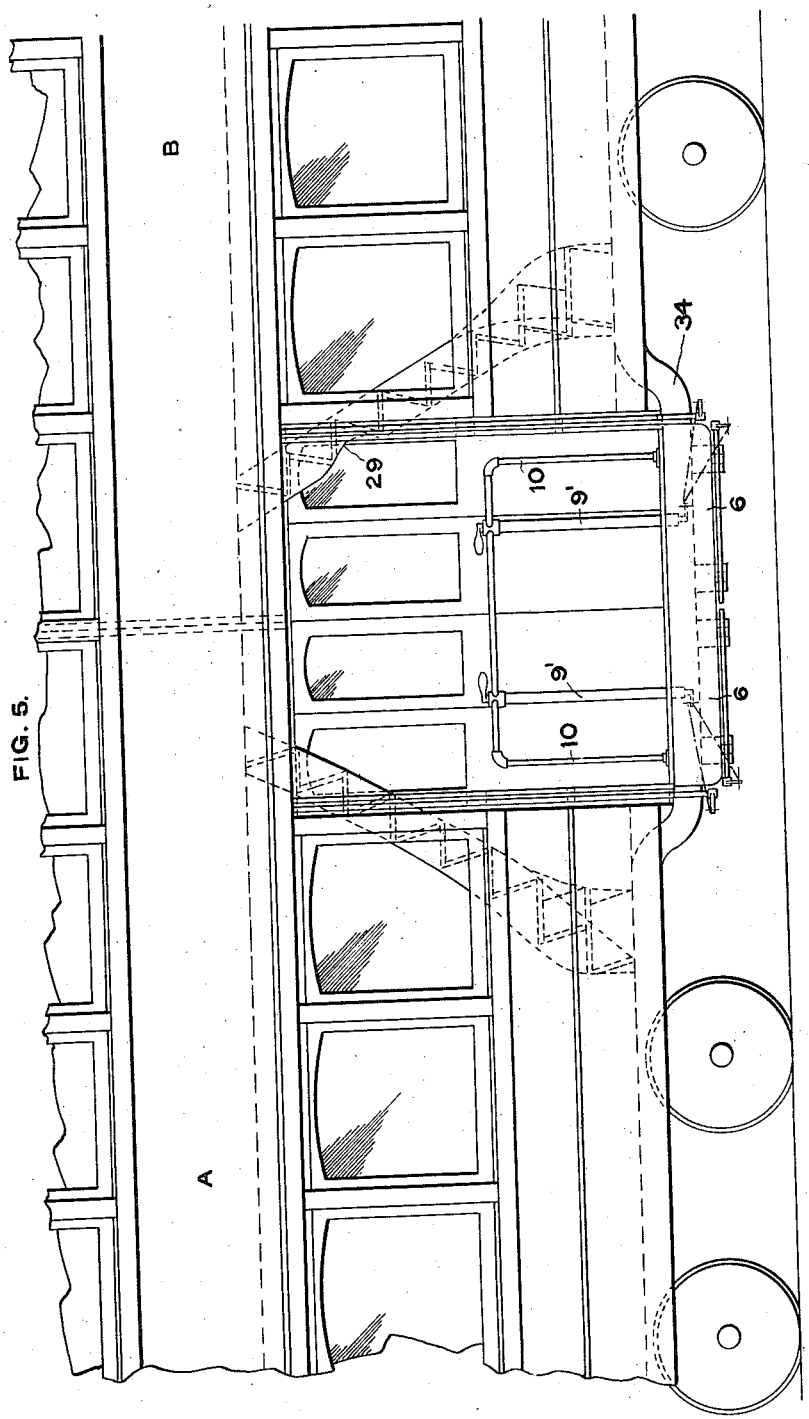

A. F. PAUL & A. J. TANNER.
PASSENGER VEHICLE.
APPLICATION FILED FEB. 1, 1913.
1,265,367.
Patented May 7, 1918.
5 SHEETS—SHEET 5.
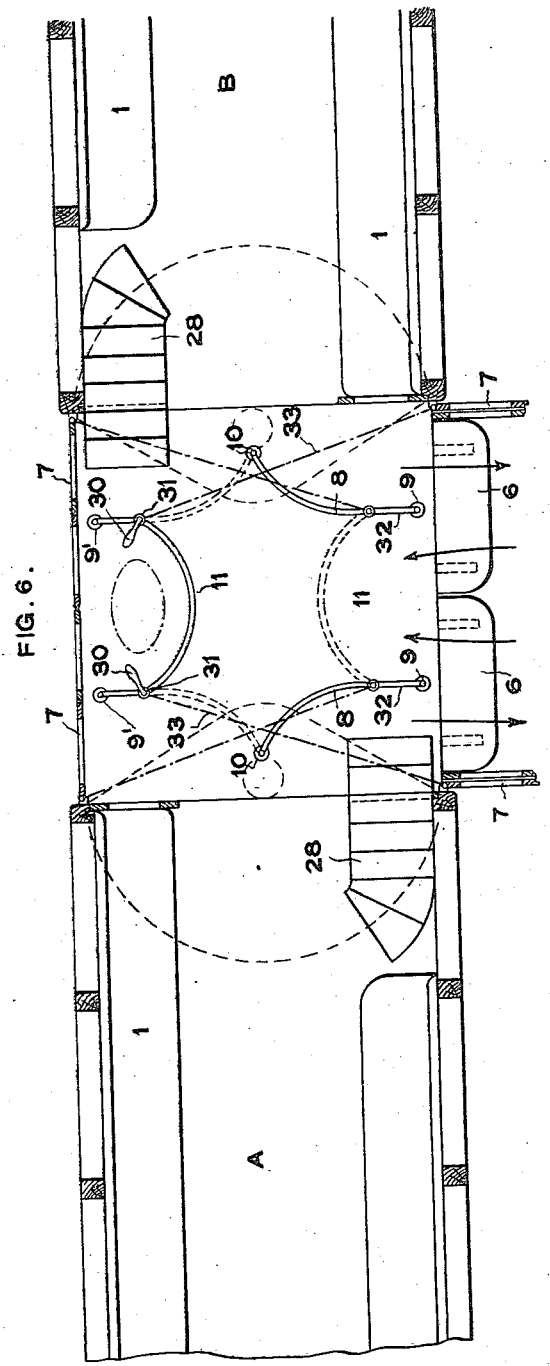

UNITED STATES PATENT OFFICE.

ABRAM FRANK PAUL AND ARNOLD J. TANNER, OF LONDON, ENGLAND, ASSIGNORS TO PREPAYMENT CAR SALES COMPANY, OF NEW YORK, N. Y., A CORPORATION OF WEST VIRGINIA.

PASSENGER-VEHICLE.

1,265,367.   Specification of Letters Patent.   Patented May 7, 1918.

Application filed February 1, 1913. Serial No. 745,586.

*To all whom it may concern:*

Be it known that we, ABRAM FRANK PAUL and ARNOLD JAMES TANNER, citizens of the United States of America, residing at London, England, have invented new and useful Improvements in Passenger-Vehicles, of which the following is a specification.

This invention relates to railway and tramway vehicles or cars and other public passenger conveyances, the invention being applicable generally to vehicles having a centrally located platform, and in one form the invention is particularly adaptable for a railway or tramway service where a prepayment system of fare collection is employed.

The object of the present invention is to improve the construction and arrangement of the vehicle with a view of providing a vehicle of the maximum length thereby obtaining greater seating capacity for the passengers, and a further object is to improve the means and arrangement thereof on or in connection with the platform for facilitating and controlling the ingress and egress of passengers, whereby the car can be rapidly loaded and unloaded and the service accordingly accelerated.

The improved car or vehicle in one form is flexible and consists essentially of articulated sections or bodies and a centrally located independently supported platform or vestibule flexibly connecting the two sections or bodies of the car or vehicle, each body or section having an entrance and exit communicating with the platform, which platform is divided into separate clearly defined ingress and egress passageways leading to or from the bodies or sections of the car. A definite inclosure is also provided for the conductor wherein he is continually stationed during a journey of the car, and from which point the conductor can conveniently control the ingress and egress of passengers to and from either of the bodies or compartments of the car or vehicle.

In another form the improved structure comprises a fixed centrally located platform adapted to be entirely closed and dividing the car into separate compartments. Certain details of construction are included which are applicable for use with either of the embodiments hereinafter described.

In order that the invention may be more clearly understood the same will hereinafter be described with reference to the accompanying drawings, in which—

Figure 1 is a side elevation illustrating one form of the invention in which the car or vehicle is divided by a centrally located independently supported platform into two separate bodies;

Fig. 2 is a plan view in section of the same construction;

Fig. 3 is a broken sectional view showing a part of the platform and the ends of the two bodies, the section being taken on the longitudinal center line of the structure;

Fig. 4 is a broken plan view in section taken on the line $a$—$a$ of Fig. 3;

Fig. 5 is a side elevation of a car having its ends broken away, and showing a centrally located platform which forms an integral part of the car structure; and Fig. 6 is a plan view in section of the same construction.

Referring first to Figs. 1 and 2 the car or vehicle is made up of two bodies A and B with the connecting platform C. The bodies are provided with the usual seats 1 and end bulkheads 2 having pockets 3 for sliding doors 4 which open or close the combined entrance and exit opening or doorway 5 provided in the bulkheads. Steps 6 are on both sides of the platform and the passengers enter and leave the car at either side according to the direction in which the car is traveling. Gates or barriers 7 are adjacent to the steps and these gates are used for closing the side of the platform not in use and when open the gates are swung out of the way to a position under the guide rails 8 which serve to define separate ingress and egress passageways on the platform. The said guide rails are arranged to be secured to the stanchions 9, and when the direction of the travel of the car is changed these guide rails, being pivoted to the stanchions or uprights 10, are swung over so that their free ends can be secured to the stanchions 9′ on the other side of the platform. When the car is traveling in a direction reverse to that indicated by the arrow the gates or barriers $7^1$ are opened for this journey, and the other gates 7 are closed and the rail 11 is removed from the position illustrated and secured in a corresponding position to the stanchion 9. The conductor is stationed within the inclosure formed by this rail 11 and it will be observed that his position is thus definitely defined and fixed; consequently crowding of the passengers cannot shift him from his position, and also the conductor being so stationed, he can easily control the ingress of the passengers and collect their fares as they pass by him before entering either of the compartments or bodies. The outgoing passengers are provided with exits on each end of the platform as indicated by the arrows $b$, the other arrows $c$ indicating the course of the incoming passengers.

It is desirable in railway and tramway services particularly for suburban tramways to provide a car or vehicle constructed to carry as many passengers as possible under the control of one conductor, and to obtain the best advantage under the present invention the centrally located platform, which may be inclosed to form a vestibule, is carried separately on an intermediate truck or under carriage 12. This truck also supports the inner ends of the two bodies A and B, which together with the platform or vestibule constitute the entire car or vehicle. These bodies are supported at the other ends preferably on single axle trucks 13. The inner ends of the said bodies A and B are connected to the intermediate truck 12 by means of a king-bolt 14 so as to allow a turning movement when the vehicle is traveling around a curve in the track. Further to insure that the vehicle will safely negotiate curves the axles of both trucks 12 and 13 are capable of having independent radial movement relatively to the vehicle, and to provide for this radial movement the trucks carrying the car body are suspended from the axle journal boxes by means of a radial swing link suspension device 15.

It is also a desirable feature that the car should be carried as low as practicable; therefore a preferable form of structure of the truck or undercarriage structure is one in which the truck side frame 16 is suspended below the axle boxes 17. Provision is also made to carry the platform on a lower level than the floor of the car body, and the low hanging side frame is particularly suitable for the purpose.

Referring now more particularly to Figs. 3 and 4 of the drawings, it will be noted that the floors 18 of the car bodies A and B are extended outwardly over the floor 19 of the platform, and to permit the turning of the platform the extended car floors 18 of the platform the extended car floors 18 are rounded off as shown, which rounded portions fit a similar shaped guard or shield 20 mounted on the floor of the platform. This guard or shield is provided for the purpose of protecting passengers against the danger of injury to them when they are passing along the platform as the car is going around a curve.

The car truck 12 is provided with transverse or cross members 21 which support the platform through the medium of springs 22 which allow an independent vertical movement of the platform, provision being also made so that this vertical movement is not interfered with at the junction between the extended elevated car floor 18 and the guard 20.

The king-bolt 14 is connected to a cross member 23 which is supported by the cross member 21. A rub-plate 24 is placed between the truck member 23 and the intermediate longitudinal beam 25 of the car body which carries the king-bolt 14. Further to permit the turning movement of the car body rub-plates 26 are carried on the underside of the car body, and car springs 27 are in contact with said rub-plates, thereby the turning movement of the ends of the car is allowed. Because the platform and ends of the car bodies are capable of an independent movement relatively to each other, a portion of the barrier or guide rail 8 is flexible so that it can be brought nearer to the combined entrance and exit, where it is connected to the stanchion $10^1$ mounted on the car floor 18.

The car is provided at each end with the usual platform D for the motorman, and this platform may be used as an emergency or auxiliary exit.

In accordance with the present invention both bodies of the car may be provided with propelling motors or motors may only be carried on one body and the other would be the equivalent of a trail car. It must also be taken into consideration that instead of radial axle trucks ordinary bogie trucks may be employed.

Referring now to Figs. 5 and 6 of the drawings, in this construction the platform may form an integral part of the car structure as shown, or as indicated by the dotted lines the platform may be supported separately from the car bodies on a truck as in the previously described instance. In the present embodiment the king pins may be carried over the platform, the floor of which is extended under the car bodies. Also in order to give flexibility the upper decks of the car bodies are connected by king-bolts with a flooring over the platform, in a manner similar as for the lower deck. Otherwise the construction of the present embodiment is practically identical with the construction hereinbefore described, except that changes in the structural details are made, and also the car is double decked; for this purpose stairways 28 leading from the lower deck to the upper deck or saloon are provided. The stairways are arranged diagonally opposite to each other and both rise from a point within the interior of the car, from which point the stairways make a partial turn and reach the floor of the upper saloon at a point over the platform, the skirting for the stairways being cut away at 29 to give head room for the passengers. The platform is capable of being totally inclosed by means of the doors 7 which are adapted to be folded up when opened as illustrated, and mechanism is provided whereby these doors can be operated by the conductor from his station within the barrier 11. The mechanism comprises handles 30 which are mounted on posts 31, these posts being fixed to the platform and are adapted to support the conductor's guide rail 11. Continuations 32 of the guide rail 8 are permanently connected between the said posts 31 and the stanchions 9.

The step 6 is divided as shown, and each half of the step serves for the incoming and outgoing passengers, and each part of the step is hinged and is capable of being operated independently of the other part but simultaneously with the closing or opening of the gate, which operation is controlled by the conductor by means of the handles 30 and connecting rods 33. When the platform arrangement is changed over at the reversal of the direction in which the car is running, the doors on the side of the car not in use are then permanently closed, and the conductor's rail together with the operating handles are changed over to the other side of the car platform.

In the present embodiment the platform is also on a lower level than the floor of the car body, and to permit the platform to be caried on this lower level the car is provided with a drop frame for supporting the platform on a lower level. The purpose of thus carrying the platform is for the convenience of the passengers when entering and leaving the car.

We claim:—

1. A flexible or articulated passenger car or vehicle consisting of two sections or bodies connected together by intermediate or centrally located platform or vestibule trucks for said bodies and an independent truck for said platform and means for detachably supporting one end of each of said bodies on said truck.

2. A passenger car having two sections or bodies flexibly connected together by a centrally located platform, a truck for said platform, independent trucks for said bodies, means for detachably supporting one end of each of said bodies upon said platform truck, and said platform being divided into separate ingress and egress passageways to and from said bodies.

3. A passenger car or vehicle divided into two sections, a truck for supporting each section, an intermediate platform or vestibule and an individual supporting truck therefor, a drop side frame for the latter truck whereby the platform or said intermediate portion is supported on a lower level than the flooring of the said sections, and means consisting of king-bolts whereby the said sections are pivotally connected to the said platform or intermediate portion.

4. A flexible or articulated passenger car or vehicle consisting of two sections or bodies connected together by an intermediate or centrally located platform or vestibule trucks for said bodies and an independent truck for said platform and means for detachably supporting one end of each of said bodies on said truck, the flooring of said intermediate platform or vestibule being carried by its truck on a lower level than the flooring of said bodies.

5. A passenger car or vehicle having a centrally located platform, a pair of end trucks and an intermediate truck for supporting the vehicle, the intermediate truck being provided with drop side frames for supporting the platform on a lower level than the flooring of the vehicle.

In testimony whereof we have signed our names to this specification in the presence of two subscribing witnesses.

ABRAM FRANK PAUL.
ARNOLD J. TANNER.

Witnesses:
HERBERT D. JAMESON,
ORLANDO J. WORTH.